(12) United States Patent
De Wit

(10) Patent No.: US 8,809,913 B2
(45) Date of Patent: Aug. 19, 2014

(54) PIXEL ARCHITECTURE AND METHOD

(71) Applicant: Yannick De Wit, Aartselaar (BE)

(72) Inventor: Yannick De Wit, Aartselaar (BE)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 13/671,184

(22) Filed: Nov. 7, 2012

(65) Prior Publication Data

US 2014/0124839 A1    May 8, 2014

(51) Int. Cl.
   *H01L 27/148*    (2006.01)
(52) U.S. Cl.
   USPC ..... 257/222; 257/233; 257/292; 257/E27.133

(58) Field of Classification Search
   USPC .......... 257/222, 233, 292, E27.133; 348/294, 348/E5.091
   See application file for complete search history.

(56) References Cited

U.S. PATENT DOCUMENTS

| | | | |
|---|---|---|---|
| 6,118,482 A * | 9/2000 | Clark et al. | 348/308 |
| 7,772,627 B2 | 8/2010 | Hong | |
| 2007/0236590 A1 | 10/2007 | Harris | |
| 2008/0079830 A1 | 4/2008 | Lepage | |
| 2012/0056080 A1 * | 3/2012 | Levine et al. | 250/214 P |

* cited by examiner

*Primary Examiner* — Timor Karimy
(74) *Attorney, Agent, or Firm* — Rennie William Dover

(57) ABSTRACT

In accordance with an embodiment, a gating device is connected to a pixel core. The gating device may include a control structure and one or more terminals, wherein the one or more terminals are commonly connected to each other and connected to the pixel core. Alternatively, the terminals may be connected to corresponding photodiodes.

20 Claims, 12 Drawing Sheets

PIXEL ARCHITECTURE AND METHOD

BACKGROUND

The present invention relates, in general, to electronics and, more particularly, to image sensors.

In the past, the electronics industry used solid-state image sensors to form camera systems. The image sensors included pixels that were configured into an array of rows and columns and contained photosensitive elements. Image sensors are disclosed in U.S. Patent Application Publication No. 2007/0236590 A1 by Brannon Harris and published on Oct. 11, 2007, U.S. Patent Application Publication No. 2008/0079830 A1 by Gerald Lepage and published on Apr. 3, 2008, U.S. Pat. No. 7,772,627 B2 issued to Sungkwon C. Hong on Aug. 10, 2010, and U.S. Patent Application Publication No. 2012/0056080 A1 by Peter Alan Levine et al. and published on Mar. 8, 2012. A drawback with these systems is the limited amount of charge that can be stored in the photodiode.

Accordingly, it would be advantageous to have a pixel and method for increasing the amount of charge that can be stored in the pixel. In addition, it is desirable for the method and circuit to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
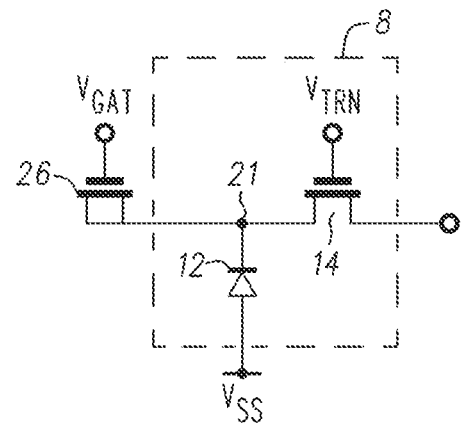
FIG. 1 is a circuit schematic of a pixel in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain N-channel or P-channel devices, or certain N-type or P-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

Generally the present invention provides a pixel and a method for storing charge in the pixel. In accordance with an embodiment, the pixel is comprised of a pixel core connected to a gating device. The pixel core may be a 4T pixel, a 5T pixel, a 6T pixel, etc. and the gating device may be a semiconductor device configured as a capacitor. By way of example, the pixel core is a four transistor (4T) pixel that includes a transfer transistor, a reset transistor, an amplifier, a select transistor, a photodiode, and a memory element. The gating device may be biased to create an inversion layer in a channel region that accepts charges from the photodiode or the volume region below the gating device. Thus, the gating device serves as a gate that opens and closes to store additional charge. In accordance with embodiments of the present invention, the photodiode and gating device may be fully depleted of charge. It should be noted that a photodiode is a type of photodetector.

In accordance with another embodiment, a method for storing charges in a pixel is provided that comprises providing a charge reception structure, draining the charges stored in the charge reception structure in preparation for storing charge in the charge reception structure. Draining the charges stored in the charge reception structure may fully deplete the photodetector. In response to overfilling the photodetector, charges are stored in the charge reception structure. Thus, charges are also stored in the photodetector and the charge reception structure. The charges stored in the charge reception structure and the photodetector are transferred to a memory element such as, for example, a floating diffusion capacitance.

FIG. 1 is a circuit schematic of a pixel 10 in accordance with an embodiment of the present invention. Pixel 10 is comprised of a pixel core 8 connected to a gating device 26, wherein pixel core 8 includes a photodiode 12 and a transfer transistor 14. By way of example, photodiode 12 is a pinned photodiode capable of being fully depleted of charge at a depletion voltage $V_{PIN}$ and transfer transistor 14 can be a Metal Oxide Field Effect Transistor (MOSFET), having a gate, a drain, and a source. Photodiode 12 may be referred to as a photodetector. As discussed above, the gate may be referred to as a control electrode, the drain may be referred to as a current carrying electrode, and the source may be referred to as a current carrying electrode. The gate of transfer transistor 14 is coupled for receiving a control signal $V_{TRN}$ and the drain of transfer transistor 14 is connected to a terminal of photodiode 12 at a node 21. The other terminal of photodiode 12 may be coupled for receiving a source of operating potential $V_{SS}$. By way of example source of operating potential $V_{SS}$ is ground. Gating device 26, also referred to as an overflow device, an overflow gate, or a charge reception structure, has a control electrode coupled for receiving a control signal $V_{GAT}$ and an electrode or terminal commonly connected to a terminal of photodiode 12 and to the drain of transfer transistor 14 at node 21. Although the drain terminal and the terminals of photodiode 12 and gating device 26 that are commonly connected together are described as terminals, it should be noted that these terminals may be formed from a common region of a semiconductor material as shown with reference to FIGS. 3-7. By way of example, gating device 26 is comprised of a device having a control electrode or control terminal and a pair of electrodes or terminals, wherein the electrodes are commonly connected together to form a single electrode or terminal that is coupled to the pixel core. Alternatively, gating device 26 may be comprised of a device having a control electrode or control terminal and a pair of electrodes or terminals.

Figure 2:
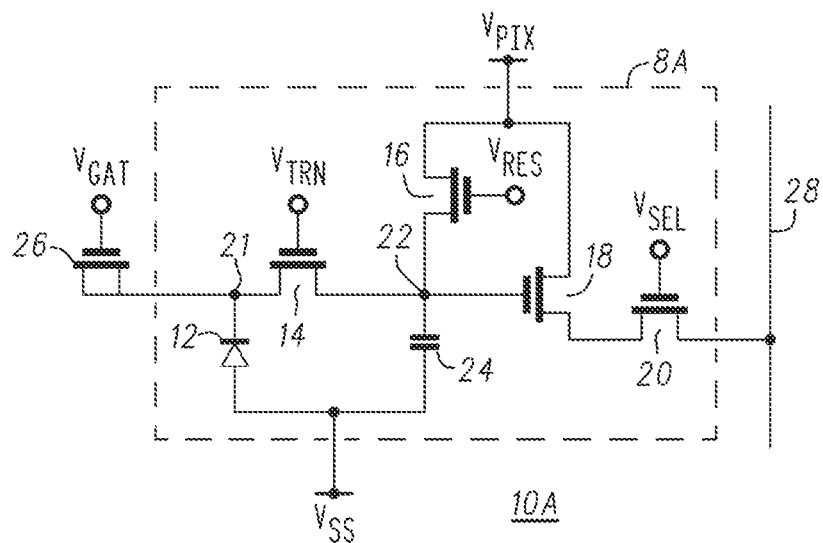
FIG. 2 is a circuit schematic of a pixel in accordance with another embodiment of the present invention.

FIG. 2 is a circuit schematic of a four transistor (4T) pixel 10A in accordance with another embodiment of the present invention. Pixel 10A is comprised of a pixel core 8A connected to gating device 26, wherein pixel core 11 is comprised of photodiode 12, transfer transistor 14, a reset transistor 16, a transistor 18 configured as a source follower, and a select transistor 20. Transistor 18 may be referred to as an amplifier, a source follower transistor, or a source follower device. By way of example, photodiode 12 is a pinned photodiode capable of being fully depleted of charge at a depletion voltage $V_{PIN}$ and transistors 14-20 can be Metal Oxide Field Effect Transistors (MOSFETs), where each transistor has a gate, a drain, and a source. As discussed above, the gate may be referred to as a control electrode, the drain may be referred to as a current carrying electrode, and the source may be referred to as a current carrying electrode. As those skilled in the art will appreciate, the terms first and second may be used with the term current carrying electrode to distinguish between the drain and source electrodes or the source and drain electrodes. The gate of transfer transistor 14 may be coupled for receiving a control signal $V_{TRN}$, the source of transfer transistor 14 is commonly connected to the source of reset transistor 16 and to the gate of source follower transistor 18 to form a node 22. The gate of reset transistor 16 may be coupled for receiving a control signal $V_{RES}$. The drain of transfer transistor 14 is connected to a terminal of photodiode 12 at node 21 and the other terminal of photodiode 12 may be coupled for receiving a source of operating potential $V_{SS}$. By way of example source of operating potential $V_{SS}$ is ground.

Source of operating potential $V_{SS}$ is connected to node 22 through a capacitance 24, which may be referred to as a floating diffusion capacitance or memory element. Node 22 is also referred to as a floating diffusion node. The drains of reset transistor 16 and source follower transistor 18 are commonly coupled for receiving a source of operating potential $V_{PIX}$. The source of source follower transistor 18 is connected to the drain of select transistor 20. The gate of select transistor 20 may be coupled for receiving a control signal $V_{SEL}$. The source of select transistor 20 is connected to a column line 28. Although transistors 14-20 have been shown as n-channel devices, i.e., nMOS devices, this is not a limitation of the present invention. For example, the transistors may be p-channel devices, junction field effect transistors, bipolar transistors, or the like. It should be noted that similar to the terminals connected together at node 21, the sources of transistors 14 and 16 and the terminal of capacitance 24 that are connected together at node 22 may be formed from a common region of a semiconductor material that is connected to the gate electrode of transistor 18.

Figure 3:
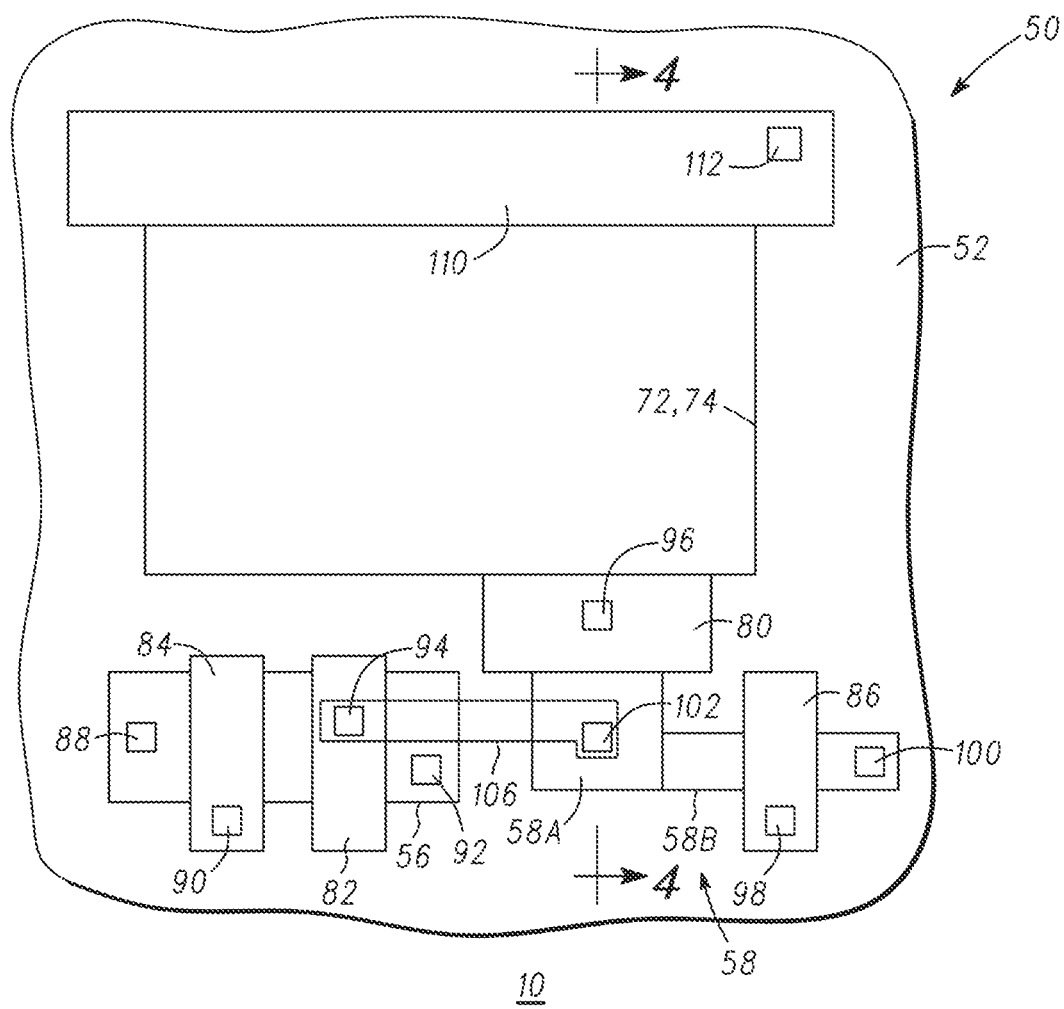
FIG. 3 is a top view of the pixel of FIG. 2 during manufacture in accordance with an embodiment of the present invention.

FIG. 3 is a top view of pixel 10 during manufacture in accordance with an embodiment of the present invention. What is shown in FIG. 3 is a portion of a semiconductor chip 50 comprising a semiconductor material 52 which can be of p-type conductivity or n-type conductivity. A doped region 74 and doped regions 56 and 58 are formed in portions of semiconductor material 52. A doped region 72 is formed over and extends into doped region 74 and is shallower than doped region 74. Because doped regions 72 and 74 overlie one another, the reference characters identify the same structure in a top view but are further illustrated in FIG. 4. Doped regions 72 and 74 serve as portions of a photodiode such as, for example, photodiode 12 shown in FIG. 2. Doped region 72 is of opposite conductivity type to doped regions 56, 58, and 74. Doped region 58 may be comprised of portions 58A and 58B that form an L-shaped region and is spaced apart from doped region 56. By way of example, semiconductor material 52 may be an epitaxial layer of p-type conductivity formed over a semiconductor substrate of p-type conductivity (not shown), doped regions 56, 58, and 74 may be regions doped with an impurity material of n-type conductivity, and doped region 72 may be a region doped with an impurity material of p-type conductivity. Doped region 58A serves as a floating diffusion region which may form a portion of floating diffusion capacitance 24. In accordance with embodiments in which doped regions 72 and 74 form a photodiode where doped region 72 is a region of p-type conductivity and doped region 74 is of n-type conductivity that is buried by doped region 72, the diode region forms a structure capable of being fully depleted of charge and exhibiting a low dark leakage current.

FIG. 3 further illustrates gate structures 80, 82, 84, and 86, contacts 88, 90, 92, 94, 96, 98, 100, and 102, and an interconnect 106. In accordance with an embodiment, gate structure 80 serves as a gate structure for transfer transistor 14; gate structure 82 serves as a gate structure for source follower transistor 18; gate structure 84 serves as a gate structure for select transistor 20; and gate structure 86 serves as a gate structure for reset transistor 16. It should be noted that interconnect 106 electrically connects doped region 58 with gate structure 82. It should be further noted that a gate structure is comprised of a gate electrode and a gate dielectric material. The gate electrode and gate dielectric materials are further illustrated in FIG. 4 and are collectively referred to as a gate structure. The gate structure is referred to as a gate in the figures containing circuit schematics. In addition, FIG. 3 illustrates a control structure 110 formed laterally adjacent to doped region 74 and over a portion of a shallow trench isolation structure 120 (shown in FIG. 4), wherein control structure 110 has a contact 112. Control structure 110 may be referred to as a gate structure and is comprised of an electrode and a dielectric material.

Figure 4:
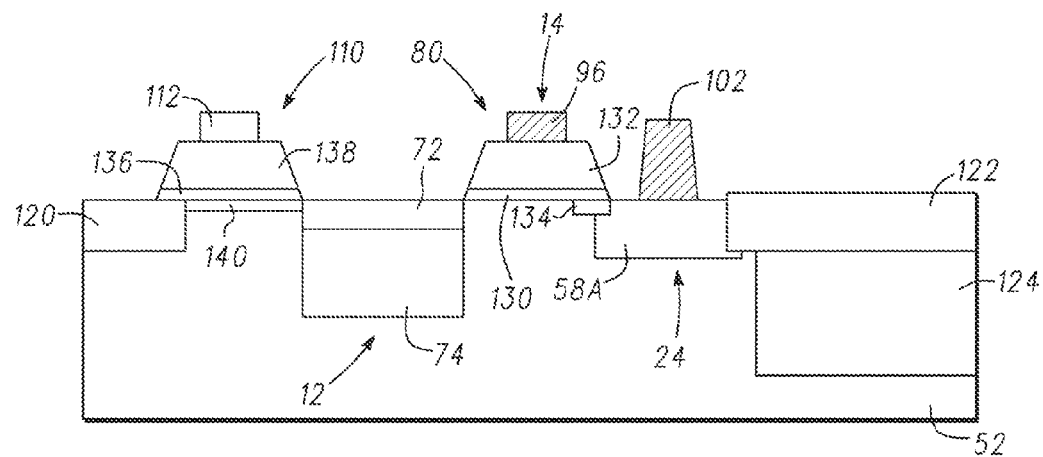
FIG. 4 is a cross-sectional view of the pixel of FIG. 3 taken along section line 4-4 of FIG. 3 in accordance with an embodiment of the present invention.

FIG. 4 is a cross-sectional view of pixel 10 taken along section line 4-4 of FIG. 3. What is shown in FIG. 4 are shallow trench isolation (STI) structures 120 and 122, a dopant well 124 of, for example, p-type conductivity, a portion of doped region 58A, a portion of doped region 74, and a portion of doped region 72 formed within doped region 74. STI structures 120 and 122 and dopant well 124 cooperate to isolate adjacent pixels from each other. FIG. 4 further illustrates gate structure 80 of transfer transistor 14 which is comprised of a gate dielectric material 130 formed on or from a portion of semiconductor material 52 and a gate electrode 132 formed on gate dielectric material 130. In addition, a lightly doped drain region 134 may be formed from a portion of semiconductor material 52 and portion 58A of doped region 58 that is below gate structure 80 and may be of an impurity type that is the same as doped region 74. Doped regions 72 and 74 are aligned to control structure 110, which overlies a portion of STI structure 120 and a portion of semiconductor material 52 that is between doped region 74 and STI structure 120. Control structure 110 is comprised of a dielectric material 136 that is formed on or from semiconductor material 52 and a control electrode 138. An electrical contact 96 is formed over gate electrode 132, an electrical contact 102 is formed over or from portion 58A of doped region 58, and an electrical contact 112 is formed over control electrode 138. For the sake of completeness, an inversion layer 140 is shown below control structure 110 and laterally between doped region 72 and STI structure 120, wherein inversion layer 140 may be formed in response to a control voltage $V_{GAT}$ applied to the control electrode of gating device 26, e.g., control structure 110.

For the sake of clarity, interconnect 106 has been omitted from FIG. 4. Photodiode 12 is laterally adjacent transfer transistor 14 and floating diffusion capacitance 24. Floating diffusion capacitance 24 is laterally adjacent gate structure 80. As discussed above, doped regions 72 and 74 cooperate to form a photodiode such as, for example, photodiode 12 and portion 58A of doped region 58 serves as floating diffusion capacitance 24.

Figure 5:
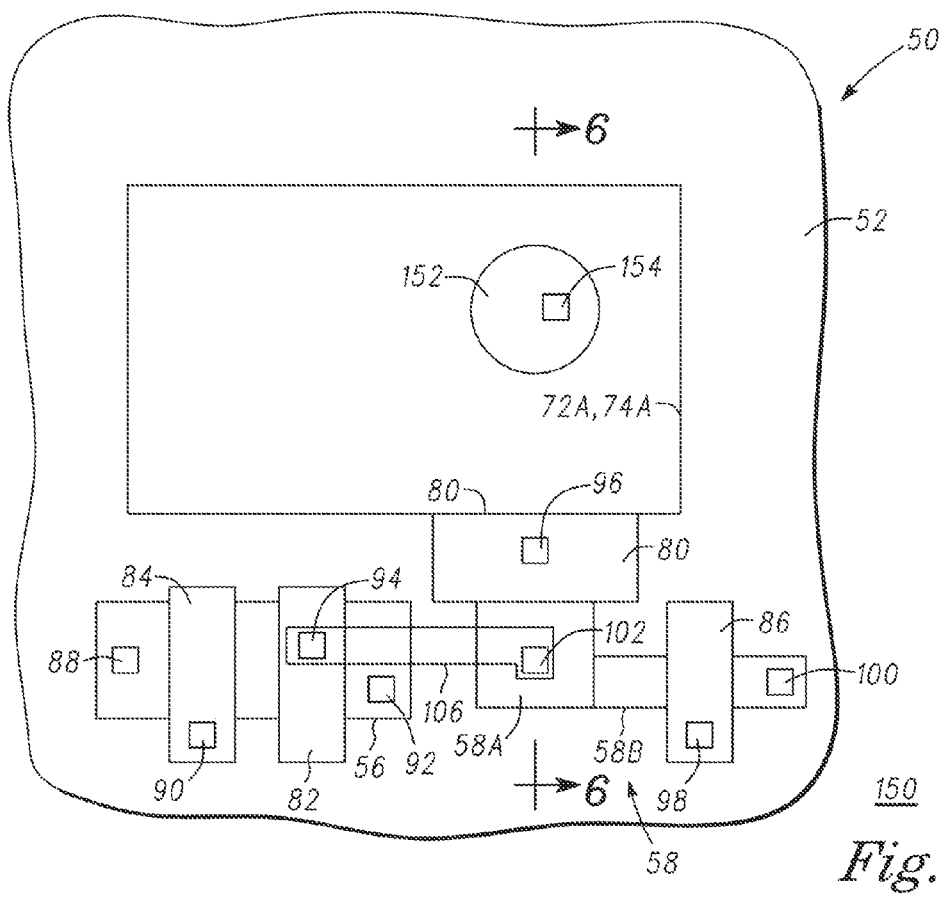
FIG. 5 is a top view of the pixel of FIG. 2 during manufacture in accordance with another embodiment of the present invention.

FIG. 5 is a top view of pixel 150 during manufacture in accordance with another embodiment of the present invention. Like pixel 10 described with reference to FIG. 3, pixel 150 includes semiconductor chip 50 comprising semiconductor material 52, doped regions 56 and 58, gate structures 80, 82, 84, and 86, contacts 88, 90, 92, 94, 96, 98, 100, and 102, and interconnect 106. In addition, pixel 150 includes doped regions 72A and 74A which form a portion of a photodiode such as, for example, photodiode 12 of FIGS. 1 and 2. It should be noted that photodiode region 74A is similar to photodiode region 74 except that it includes a circular region under a control structure 152 in which the impurity material of doped regions 74A and 72A may be absent. Because doped region 72A overlies doped region 74A, the reference characters identify the same structure in a top view but are further illustrated in FIG. 6.

Figure 6:
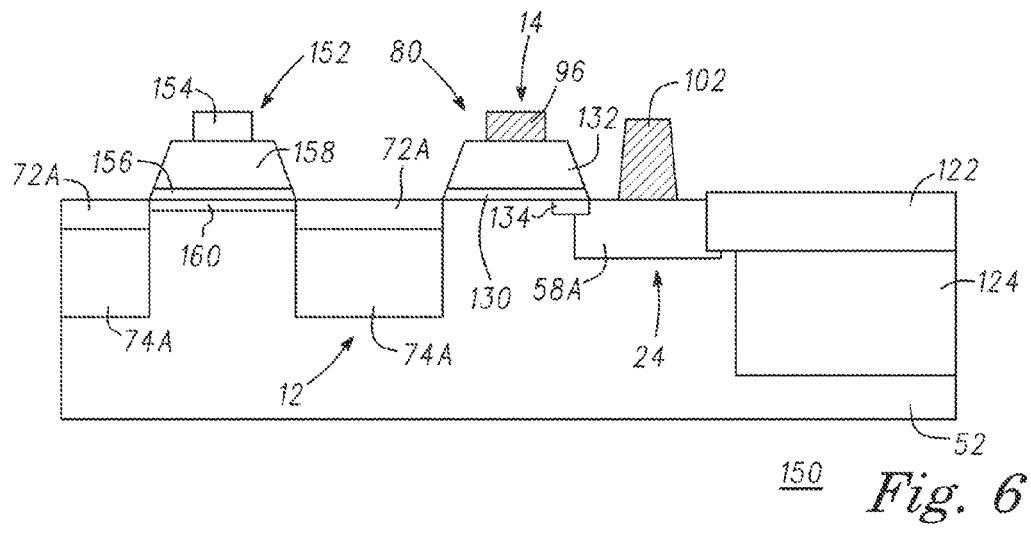
FIG. 6 is a cross-sectional view of the pixel of FIG. 5 taken along section line 6-6 of FIG. 5 in accordance with another embodiment of the present invention.

Pixel 150 further includes a control structure 152 having a contact 154 formed adjacent to a portion of doped region 74A. By way of example, control structure 152 is a circular control electrode over the circular region from which the impurity material of doped regions 74A and 72A may be absent as illustrated in FIG. 6. The shape of a control structure such as, for example, control structure 152 is not limited to being circular. It could be shaped as a square, a triangle, a rectangle, other polygonal shapes, a crescent, a half circle, etc. Furthermore, control structure 152 can be located on different places over semiconductor material 52, i.e., it can be located on the middle portion of areas shown as doped regions 74A and 72A, over the lateral or vertical portions of the areas shown as doped regions 74A and 72A, etc. In addition, there may be more than one control structure 152, where each control structure has its own control electrode or each control electrode shares a common gate electrode with one or more of the other control electrodes.

FIG. 6 is a cross-sectional view of pixel 150 taken along section line 6-6 of FIG. 5. What is shown in FIG. 6 are shallow trench isolation (STI) structure 122, dopant well 124, a portion of doped region 58A, gate structure 80, dielectric material 130, gate electrode 132, and portion 58A of doped region 58 below gate structure 80 described with reference to FIG. 4. STI structure 122 and dopant well 124 cooperate to isolate adjacent pixels from each other. By way of example, dopant well 124 is of p-type conductivity. FIG. 6 further illustrates doped regions 72A and 74A. Control electrode 152 is formed over a portion of semiconductor material 52 that is laterally bounded by doped regions 74A and 72A. Control electrode 152 is comprised of a dielectric material 156 that is formed on or from semiconductor material 52 and a control conductor 158. An electrical contact 96 is formed in contact with gate structure 80, an electrical contact 102 is formed over or from portion 58A of doped region 58, and an electrical contact 154 is formed in contact with control conductor 152. For the sake of completeness, an inversion layer 160 is shown as being formed in the portion of semiconductor material 52 that is below control electrode 152 and laterally between portions of doped region 72A. It should be noted that inversion layer 160 is formed in response to a control voltage applied to control electrode 152.

For the sake of clarity, interconnect 106 has been omitted from FIG. 6. Photodiode 12 is laterally adjacent to transfer transistor 14. Portion 58A of doped region 58 serves as a portion of floating diffusion capacitance 24 and is laterally adjacent gate structure 80. As discussed above, doped regions 72A and 74A cooperate to form photodiode 12 and portion 58A of doped region 58 serves as floating diffusion capacitance 24.

Figure 7:
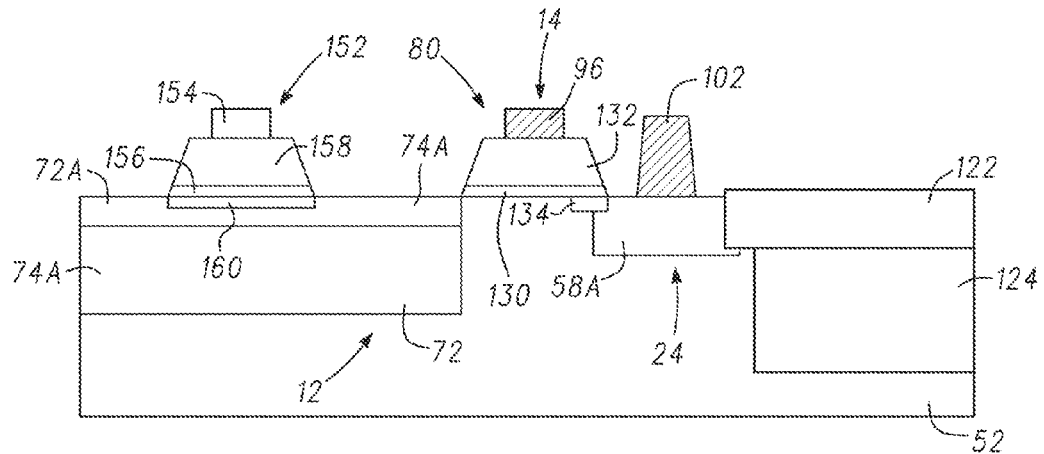
FIG. 7 is a cross-sectional view of the pixel of FIG. 5 taken along section line 6-6 of FIG. 5 in accordance with another embodiment of the present invention.

FIG. 7 is a cross-sectional view of a pixel 175 taken along the region of section line 6-6 of FIG. 5. Pixel 175 is similar to pixel 150 except that doped regions 74A and 72A are formed in the portion of semiconductor material 52 under control structure 152.

Figure 8:
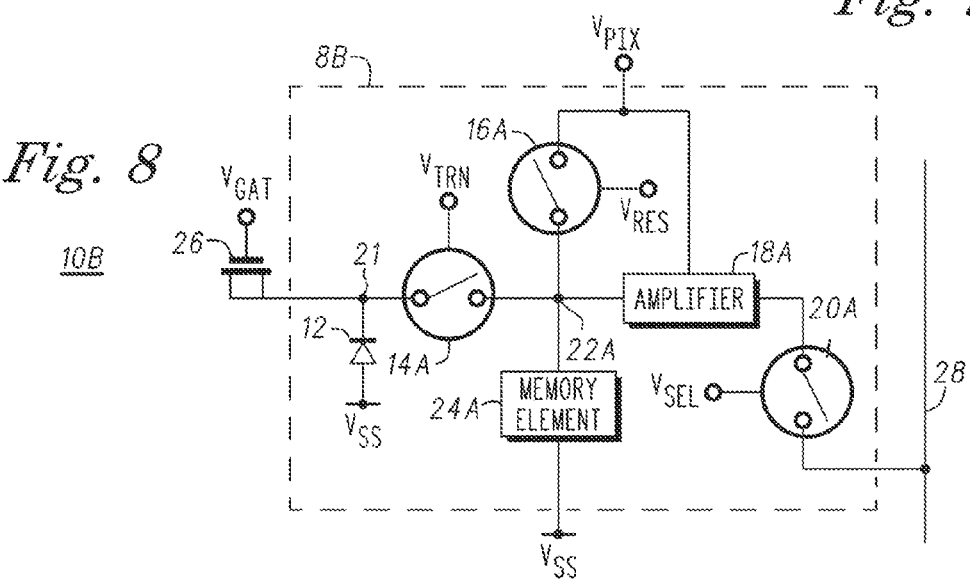
FIG. 8 is a circuit schematic of a pixel in accordance with another embodiment of the present invention.

FIG. 8 is a circuit schematic of a pixel 10B in accordance with another embodiment of the present invention. Pixel 10B is comprised of a pixel core 8B connected to gating device 26, wherein pixel core 8B is comprised of photodiode 12, a transfer switch 14A, a reset switch 16A, an amplifier 18A, a select switch 20A, and a memory element 24A. Each of switches 14A-20A has a control terminal and a pair of current carrying terminals. The control terminal of transfer switch 14A is coupled for receiving control signal $V_{TRN}$ and the control terminal of reset switch 16A is coupled for receiving a control signal $V_{RES}$. Transfer switch 14A has a current carrying terminal connected to a terminal of photodiode 12 and a current carrying terminal commonly connected to a current carrying terminal of reset switch 16A, an input or input terminal of amplifier 18A, and a terminal of memory element 24A to form a node 22A. The other current carrying terminal of reset switch 16A is coupled for receiving a source of operating potential such as, for example, $V_{PIX}$. The other terminal of photodiode 12 and a terminal of memory element 24A are coupled for receiving source of operating potential $V_{SS}$. By way of example, source of operating potential $V_{SS}$ is at ground potential. It should be noted that the voltage level of source of operating potential $V_{SS}$ is not a limitation of the present invention. Amplifier 18A has an output or current carrying terminal connected to a terminal of select switch 20A, an input connected to node 22A, and a terminal coupled for receiving source of operating potential $V_{PIX}$. Select switch 20A has a control terminal coupled for receiving control signal $V_{SEL}$, a terminal connected to the output terminal of amplifier 18A, and a terminal connected to column line 28.

Figure 9:
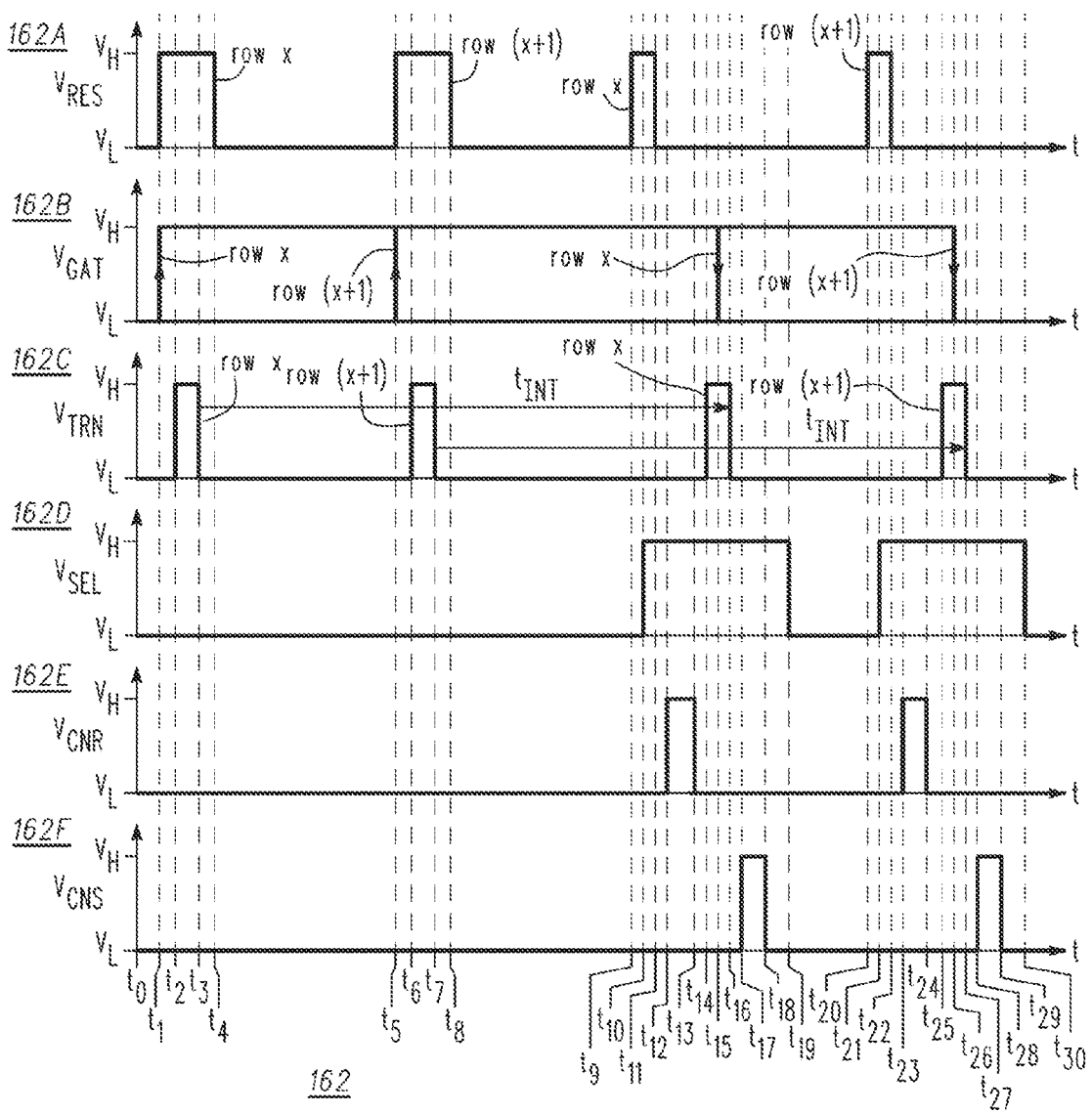
FIG. 9 is a timing diagram of operation of the pixels of FIGS. 2 and 8 in accordance with an embodiment of the present invention.

FIG. 9 is a timing diagram 162 for operation of pixels 10, 10A, 10B, 150, or 175 in a rolling shutter mode of operation and in accordance with embodiments of the present invention. It should be noted that a pixel such as, for example, pixel 10 is generally one of multiple pixels in an array of pixels (not shown) arranged in multiple rows and multiple columns, wherein pixel outputs from each column of the multiple rows of pixels are coupled to shared column 28 of each row of pixels in the array. The array of pixels is formed in a layer of semiconductor material on a common shared wafer or substrate, which may include other elements and circuits of an image sensor. Timing diagram 162 includes plots 162A, 162B, 162C, 162D, 162E, and 162F illustrating signals $V_{RES}$, $V_{GAT}$, $V_{TRN}$, $V_{SEL}$, $V_{CNR}$, and $V_{CNS}$, respectively. At time $t_0$, signals $V_{RES}$, $V_{GAT}$, $V_{TRN}$, $V_{SEL}$, $V_{CNR}$, and $V_{CNS}$ are at logic low voltage levels. At time $t_1$, control signal $V_{GAT}$ at the control terminal of gating device 26 and control signal $V_{RES}$ at the control terminal of transistor 16 (or the control terminal of reset switch 16A) transition to a logic high voltage level $V_H$. In response to voltages $V_{GAT}$ and $V_{RES}$ transitioning to logic high voltage level $V_H$, gating device 26 and floating diffusion capacitance 24 (or memory element 24A) are reset. At time $t_2$, control signal $V_{TRN}$ at the control terminal of transfer transistor 14 (or the control terminal of transfer switch 14A) transitions to logic high voltage level $V_H$, resetting photodiode 12.

Figure 10:
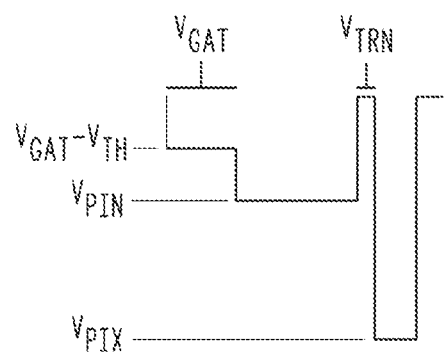
FIG. 10 is an energy band diagram of the pixels of FIGS. 2 and 8 during operation in accordance with an embodiment of the present invention.

In accordance with embodiments in which photodiode 12 is capable of being fully depleted, resetting photodiode 12 drains away all or substantially all the charges stored in photodiode 12 in preparation for charge integration, i.e., photodiode 12 is fully depleted or substantially fully depleted. In accordance with an embodiment, resetting gating device 26 drains away all or substantially all the charges in gating device 26 in preparation for storing charge in gating device 26, i.e., before storing additional charges in gating device 26. Briefly referring to FIG. 10, an energy band diagram illustrating that the channel region formed under the control electrode of gating device 26 and photodiode 12 are substantially fully depleted is shown. It should be noted that in other embodiments, these regions may not be fully depleted but the charge in these regions is very low. It should be further noted that for n-channel devices the charges stored in photodiode 12 are electrons and for p-channel devices the charges stored in photodiode 12 are holes.

Figure 11:
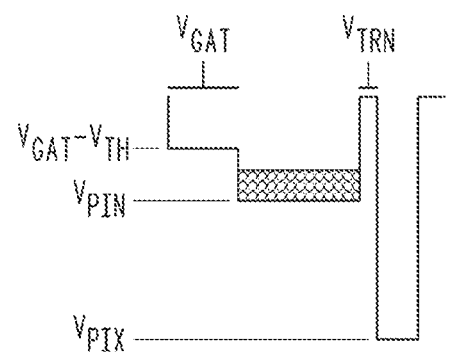
FIG. 11 is an energy band diagram of the pixels of FIGS. 2 and 8 during operation in accordance with an embodiment of the present invention.

At time $t_3$, control signal $V_{TRN}$ at the control terminal of transfer transistor 14 (or the control terminal of transfer switch 14A) transitions to logic low voltage level $V_L$. In response to control voltage $V_{TRN}$ transitioning to logic low voltage level $V_L$ at time $t_3$, transfer transistor 14 turns off, closing the transfer gate and beginning the integration phase $t_{INT}$ of a row of pixels (not shown), e.g., row x, in which an image is captured. Briefly referring to FIG. 11, an energy band diagram is shown illustrating that the charges generated by light are captured by photodiode 12. At time $t_4$, control voltage $V_{RES}$ transitions to logic low voltage level $V_L$. In response to closing the transfer gate, i.e., turning off transfer transistor 14, light generated charges are captured in photodiode 12.

Figure 12:
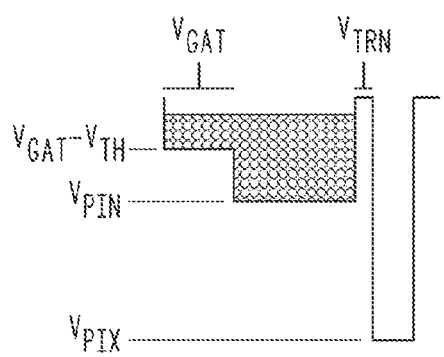
FIG. 12 is an energy band diagram of the pixels of FIGS. 2 and 8 during operation in accordance with an embodiment of the present invention.

In response to overfilling photodiode 12 with charges, such as, for example electrons or holes, its potential rises to a level beyond the channel potential of gating device 26 and charge flows into the channel region of gating device 26. FIG. 12 is an energy band diagram illustrating the charge captured by photodiode 12 exceeding the channel potential of gating device 26 and flowing into its channel region. A high voltage applied to gating device 26 generates an inversion layer in the portion of the semiconductor material controlled by the control electrode of gating device 26 and allows a large amount of charge to be stored because the capacitive densities of oxide layers 136 or 156 of FIGS. 4 and 6, respectively, are relatively high, e.g., for a thick oxide the capacitive density is about 5 femtoFarads per micron squared (fF/$\mu m^2$). The extra storage capacitance extends the full well charge without significantly increasing the pixel size.

At time $t_5$, control signal $V_{GAT}$ at the control terminal of gating device 26 and control signal $V_{RES}$ at the control terminal of transistor 16 (or the control terminal of reset switch 16A) transition to logic high voltage level $V_H$. In response to voltages $V_{GAT}$ and $V_{RES}$ transitioning to logic high voltage level $V_H$, gating device 26 and floating diffusion capacitance 24 are reset for row (x+1). At time $t_6$, control signal $V_{TRN}$ at the control terminal of transfer transistor 14 (or the control terminal of transfer switch 14A) transitions to logic high voltage level $V_H$, resetting photodiode 12 and beginning the integration phase $t_{INT}$ of row (x+1) of the rows of pixels.

In accordance with an embodiment in which photodiode 12 is capable of being fully depleted, resetting photodiode 12 drains away all or substantially all the charges stored in photodiode 12. In accordance with an embodiment, resetting overflow device 26 drains away all or substantially all the charges in overflow device 26. Briefly referring to FIG. 10, an energy band diagram illustrating that the channel region formed under the control electrode of overflow device 26 and photodiode 12 are substantially fully depleted is shown. It should be noted that in other embodiments, these regions may not be fully depleted but the charges in these regions is very low. It should be further noted that for n-channel devices the charges stored in photodiode 12 are electrons and for p-channel devices the charges stored in photodiode 12 are holes.

At time $t_7$, control signal $V_{TRN}$ at the control terminal of transfer transistor 14 (or the control terminal of transfer switch 14A) transitions to logic low voltage level $V_L$. In response to control voltage $V_{TRN}$ transitioning to logic low voltage level $V_L$ at time $t_7$, transfer transistor 14 turns off, closing the transfer gate and beginning the integration phase of a subsequent row of pixels (not shown), i.e., row (x+1), in which an image is captured. At time $t_8$, control voltage $V_{RES}$ transitions to logic low voltage level $V_L$. In response to closing the transfer gate, i.e., turning off transfer transistor 14, light generated charges are captured in photodiode 12. Briefly referring to FIG. 11, an energy band diagram is shown and illustrates that the charges generated by light are captured by photodiode 12.

In response to overfilling photodiode 12 with charges, such as, for example electrons or holes, its potential rises to a level beyond the channel potential of gating device 26 and charge flows into the channel region of gating device 26. FIG. 12 is an energy band diagram illustrating the charge captured by photodiode 12 exceeding the channel potential of gating device 26 and flowing into its channel region. As discussed above, a high voltage applied to gating device 26 allows a large amount of charge to be stored because the capacitive densities of oxide layers 136 or 156 shown in FIGS. 4 and 6, respectively, are relatively high, e.g., for a thick oxide the capacitive density is about 5 femtoFarads per micron squared (fF/μm$^2$). The extra storage capacitance extends the full well charge without significantly increasing the pixel size.

At time $t_9$, control signal $V_{RES}$ transitions to logic high voltage level $V_H$ resetting floating diffusion capacitance 24 (or memory element 24A). At time $t_{10}$, control signal $V_{SEL}$ transitions to logic high voltage level $V_H$ and at time $t_{11}$ control signal $V_{RES}$ transitions to logic low voltage level $V_L$ in preparation for reading row x of the rows of pixels, where x is an integer. At time $t_{12}$, control signal $V_{CNR}$ transitions to logic high voltage level $V_H$ reading out the pixel signal value of the pixel selected from row x. At time $t_{13}$, control signal $V_{CNR}$ transitions to logic low voltage level $V_L$.

Figure 13:
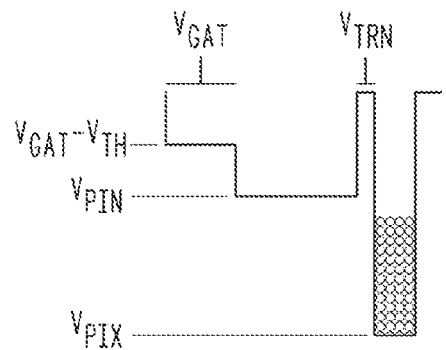
FIG. 13 is an energy band diagram of the pixels of FIGS. 2 and 8 during operation in accordance with an embodiment of the present invention.

At time $t_{14}$, control signal $V_{TRN}$ transitions to logic high voltage level $V_H$ transferring the charge from photodiode 12 and overflow device 26 to floating diffusion capacitance 24 via transfer transistor 14 (or transfer switch 14A). At time $t_{15}$, control signal $V_{GAT}$ transitions to logic low voltage level $V_L$. FIG. 13 is an energy band diagram illustrating that the charges stored in photodiode 12 and overflow device 26 are transferred to floating diffusion capacitance 24.

At time $t_{16}$, control signal $V_{TRN}$ transitions to logic low voltage level $V_L$ turning off transfer transistor 14 and at time $t_{17}$ control signal $V_{CNS}$ transitions to logic high voltage level $V_H$ reading out the pixel signal value. At time $t_{18}$ control signal $V_{CNS}$ transitions to logic low voltage level $V_L$.

At time $t_{19}$, control signal $V_{SEL}$ transitions to logic low voltage level $V_L$.

At time $t_{20}$, control signal $V_{RES}$ transitions to logic high voltage level $V_H$, resetting floating diffusion capacitance 24 (or memory element 24A). At time $t_{21}$, control signal $V_{SEL}$ transitions to logic high voltage level $V_H$ and at time $t_{22}$ control signal $V_{RES}$ transitions to logic low voltage level $V_L$ in preparation for reading row (x+1) of the rows of pixels. At time $t_{23}$, control signal $V_{CNR}$ transitions to logic high voltage level $V_H$, reading out the pixel signal value of the pixel selected from row (x+1) of the rows of pixels. At time $t_{24}$, control signal $V_{CNR}$ transitions to logic low voltage level $V_L$.

At time $t_{25}$, control signal $V_{TRN}$ transitions to logic high voltage level $V_H$ transferring the charge from photodiode 12 and overflow device 26 to floating diffusion capacitance 24 via transfer transistor 14 (or transfer switch 14A). At time $t_{26}$, control signal $V_{GAT}$ transitions to logic low voltage level $V_L$.

At time $t_{27}$, control signal $V_{TRN}$ transitions to logic low voltage level $V_L$ turning off transfer transistor 14 and at time $t_{28}$ control signal $V_{CNS}$ transitions to logic high voltage level $V_H$, reading out the pixel signal value. At time $t_{29}$ control signal $V_{CNS}$ transitions to logic low voltage level $V_L$.

At time $t_{30}$, control signal $V_{SEL}$ transitions to logic low voltage level $V_L$.

Figure 14:
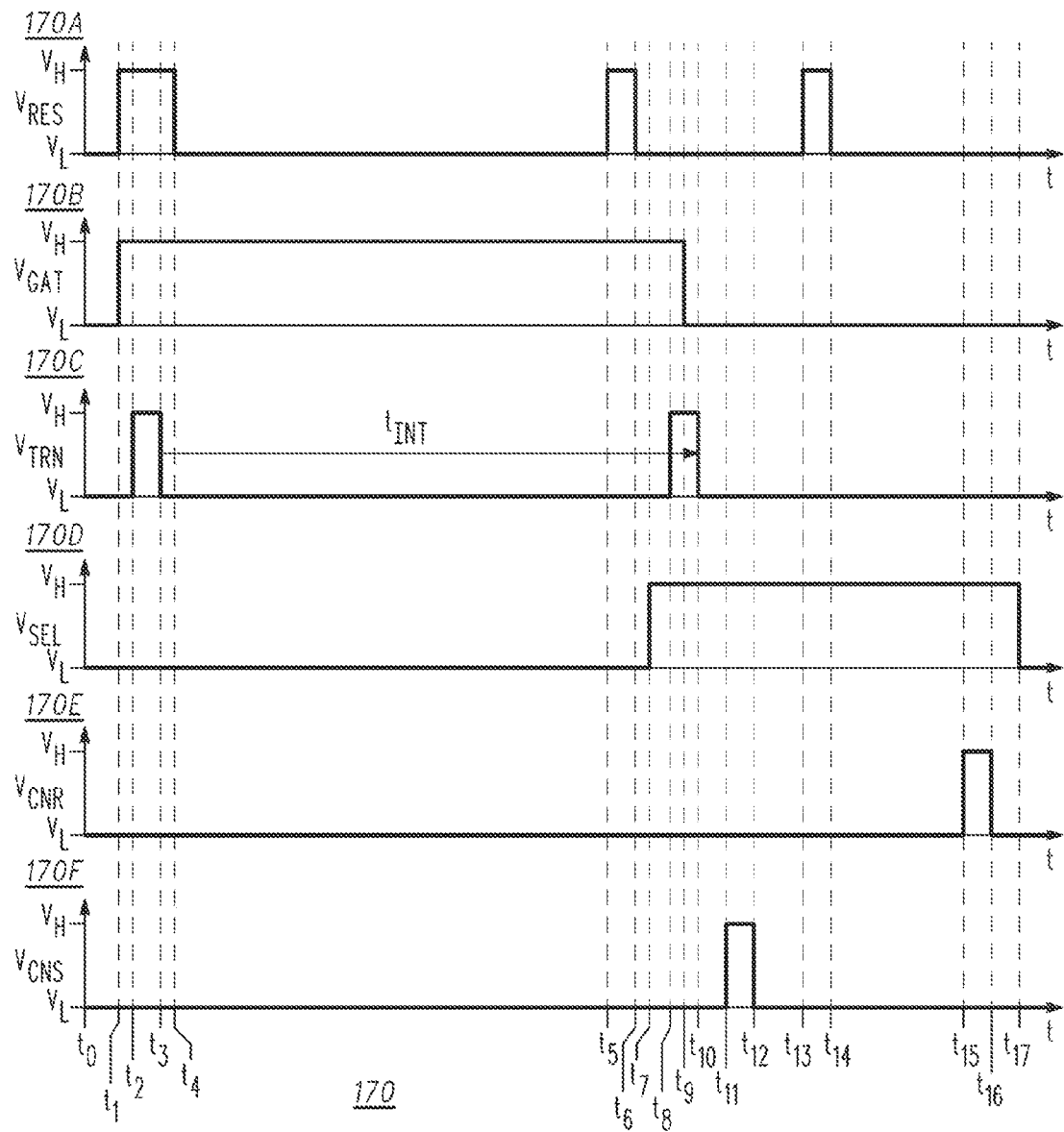
FIG. 14 is a timing diagram of operation of the pixels of FIGS. 2 and 8 in accordance with another embodiment of the present invention.

FIG. 14 is a timing diagram 170 for operation of pixels 10, 10A, 10B, 150, or 175 in a snapshot shutter mode of operation and in accordance with embodiments of the present invention. It should be noted that in the snapshot operating mode, the reset and transfer operations are global operations for all the pixels, i.e., control signals $V_{RES}$ and $V_{TRN}$ are global signals, and the readout is row based. Timing diagram 170 includes plots 170A, 170B, 170C, 170D, 170E, and 170F illustrating signals $V_{RES}$, $V_{GAT}$, $V_{TRN}$, $V_{SEL}$, $V_{CNR}$, and $V_{CNS}$, respectively. At time $t_0$, signals $V_{RES}$, $V_{GAT}$, $V_{TRN}$, $V_{SEL}$, $V_{CNR}$, and $V_{CNS}$ are at logic low voltage levels. At time $t_1$, control signal $V_{GAT}$ at the control terminal of gating device 26 and control signal $V_{RES}$ at the control terminal of transistor 16 (or the control terminal of reset switch 16A) transition to logic high voltage level $V_H$. In response to voltages $V_{GAT}$ and $V_{RES}$ transitioning to logic high voltage level $V_H$, gating device 26 and floating diffusion capacitance 24 (or memory element 24A) are reset. At time $t_2$, control signal $V_{TRN}$ at the control terminal of transfer transistor 14 (or the control terminal of transfer switch 14A) transitions to logic high voltage level $V_H$, resetting photodiode 12.

In accordance with an embodiment in which photodiode 12 is capable of being fully depleted, resetting photodiode 12 drains away all or substantially all the charges stored in photodiode 12. Resetting overflow device 26 drains away all or substantially all the charges in overflow device 26. Briefly referring to FIG. 10, an energy band diagram illustrating that the channel region formed under the control electrode of overflow device 26 and photodiode 12 are substantially fully depleted is shown. It should be noted that in other embodiments, these regions may not be fully depleted but the charge in these regions is very low. It should be further noted that for n-channel devices the charges stored in photodiode 12 are electrons and for p-channel devices the charges stored in photodiode 12 are holes.

At time $t_3$, control signal $V_{TRN}$ at the control terminal of transfer transistor 14 (or the control terminal of transfer switch 14A) transitions to logic low voltage level $V_L$. In response to control voltage $V_{TRN}$ transitioning to logic low voltage level $V_L$ at time $t_3$, transfer transistor 14 turns off, closing the transfer gate and beginning the integration phase $t_{INT}$ of all pixels (not shown) in which an image is captured in the snapshot shutter mode of operation. At time $t_4$, control voltage $V_{RES}$ transitions to logic low voltage level $V_L$. In response to closing the transfer gate, i.e., turning off transfer transistor 14, light generated charges are captured in photodiode 12. Briefly referring to FIG. 11, an energy band diagram is shown that illustrates the charges generated by light are captured by photodiode 12.

In response to overfilling photodiode 12 with charges, such as, for example electrons or holes, its potential rises to a level beyond the channel potential of gating device 26 and charge flows into the channel region of gating device 26. FIG. 12 is an energy band diagram illustrating the charge captured by photodiode 12 exceeding the channel potential of gating device 26 and flowing into its channel region. A high voltage applied to gating device 26 allows a large amount of charge to be stored because the capacitive densities of oxide layers 136 or 156 of FIGS. 4 and 6, respectively, are relatively high, e.g., for a thick oxide the capacitive density is about 5 femtoFarads per micron squared ($fF/\mu m^2$). The extra storage capacitance extends the full well charge without significantly increasing the pixel size.

At time $t_5$, a reset control signal $V_{RES}$ transitions to logic high voltage level $V_H$ and at time $t_6$, reset control signal $V_{RES}$ transitions to logic low voltage level $V_L$. The reset signal at time $t_5$ serves as a global reset to inhibit the reset value from being leaked away during integration.

At time $t_7$ control signal $V_{SEL}$ transitions to logic high voltage level $V_H$ and at time $t_8$, control signal $V_{TRN}$ transitions to logic high voltage level $V_H$ transferring the charge from photodiode 12 and overflow device 26 to floating diffusion capacitance 24 via transfer transistor 14 (or transfer switch 14A). At time $t_9$, control signal $V_{GAT}$ transitions to logic low voltage level $V_L$. FIG. 13 is an energy band diagram illustrating that the charges stored in photodiode 12 and overflow device 26 are transferred to floating diffusion capacitance 24.

At time $t_{10}$, control signal $V_{TRN}$ transitions to logic low voltage level $V_L$ turning off transfer transistor 14 and at time $t_{11}$ control signal $V_{CNS}$ transitions to logic high voltage level $V_H$, reading out the pixel signal value. At time $t_{12}$ control signal $V_{CNS}$ transitions to logic low voltage level $V_L$.

At time $t_{13}$, control signal $V_{RES}$ transitions to logic high voltage level $V_H$, resetting floating diffusion capacitance 24 (or memory element 24A) for the row to be read out. It should be noted that control signal $V_{RES}$ at time $t_{13}$ is a row based reset signal. At time $t_{14}$, control signal $V_{RES}$ transitions to logic low voltage level $V_L$.

At time $t_{15}$, control signal $V_{CNR}$ transitions to logic high voltage level $V_H$ reading out the pixel signal value for the selected row. At time $t_{16}$, control signal $V_{CNR}$ transitions to logic low voltage level $V_L$.

At time $t_{17}$, control signal $V_{SEL}$ transitions to logic low voltage level $V_L$.

Figure 15:
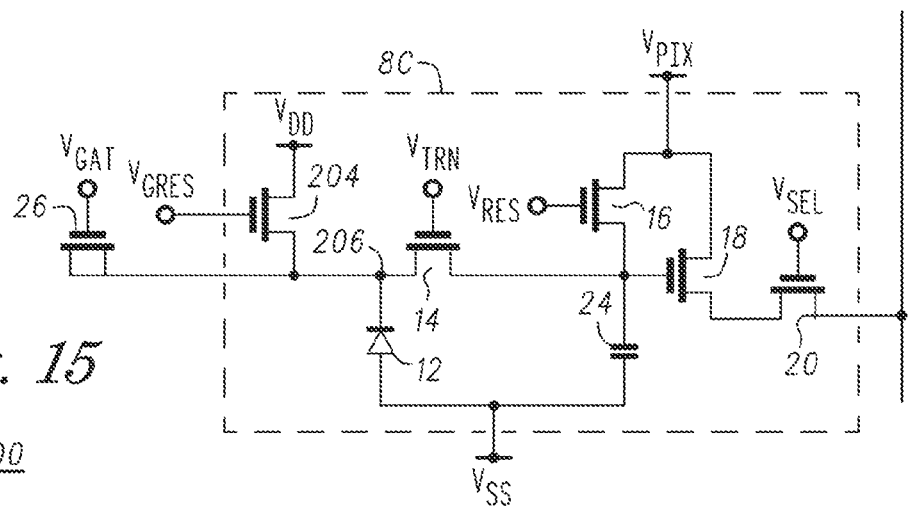
FIG. 15 is a circuit schematic of a pixel in accordance with another embodiment of the present invention.

FIG. 15 is a circuit schematic of a pixel 200 in accordance with another embodiment of the present invention. Pixel 200 is comprised of pixel core 8C connected to gating device 26, wherein pixel core 8C is comprised of photodiode 12, transfer transistor 14, reset transistor 16, source follower transistor 18, select transistor 20, and floating diffusion capacitance 24 described with reference to FIG. 2. Pixel core 8C, and thus pixel 200, further includes global reset transistor 204 which has a drain coupled for receiving a source of operating potential $V_{DD}$. A source of global reset transistor 204, a terminal of photodiode 12, a drain of transfer transistor 14, and the terminal of gating device 26 are connected at a node 206. Global reset transistor 204 further includes a gate coupled for receiving a global reset control signal $V_{GRES}$. Accordingly, pixel 200 comprises a five transistor (5T) pixel core connected to gating device 26.

Figure 16:
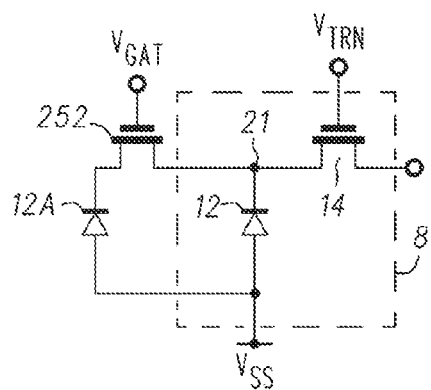
FIG. 16 is a circuit schematic of a pixel in accordance with another embodiment of the present invention.

FIG. 16 is a circuit schematic of a pixel 250 in accordance with another embodiment of the present invention. Pixel 250 is comprised of pixel core 8 (described with reference to FIG. 1) connected to a gating device 252, wherein pixel core 8 is comprised of photodiode 12 and transfer transistor 14. Pixel 250 further includes a photodiode 12A. By way of example, photodiodes 12 and 12A are pinned photodiodes capable of being fully depleted of charge at depletion voltages $V_{PIN}$ and $V_{PINA}$, respectively. It should be noted that photodiodes 12 and 12A may be the same type of photodiode but they may have different depletion voltages. Photodiodes 12 and 12A may be referred to as photodetectors. Because the depletion voltages may be different, they have been identified by labels $V_{PIN}$ and $V_{PINA}$. Transfer transistor 14 has been described with reference to pixel 10 shown in FIG. 1. The gate of transfer transistor 14 is coupled for receiving a control signal $V_{TRN}$ and the drain of transfer transistor 14 is connected to a terminal of photodiode 12 at a node 21. Gating device 252 has a control electrode coupled for receiving a gating control signal $V_{GAT}$, a terminal commonly connected to the terminal of photodiode 12 and to the source of transfer transistor 14 at node 21, and a terminal connected to a terminal of photodiode 12A. The other terminals of photodiodes 12 and 12A may be coupled for receiving a source of operating potential $V_{SS}$. By way of example source of operating potential $V_{SS}$ is ground. Gating device 252 may also be referred to as an overflow device, an overflow gate, or a charge reception structure and the terminals of gating device 252 may be referred to as electrodes. Although the source terminal and the terminals of photodiode 12 and gating device 252 that are commonly connected together are described as terminals, it should be noted that these terminals may be formed from a common region of a semiconductor material as shown with reference to FIGS. 17 and 18.

Figure 17:
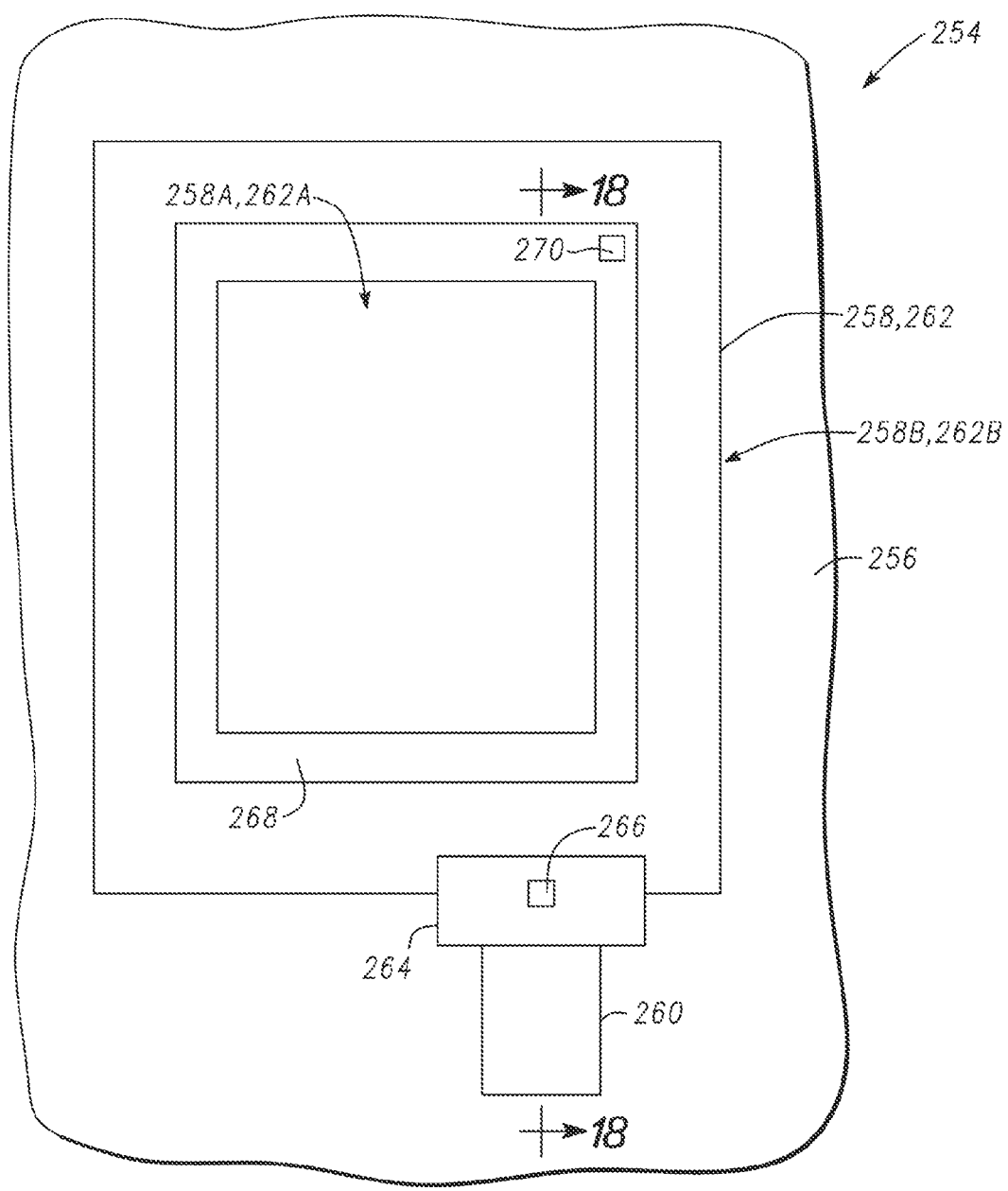
FIG. 17 is a top view of the pixel of FIG. 16 during manufacture in accordance with another embodiment of the present invention.

FIG. 17 is a top view of pixel 250 during manufacture in accordance with another embodiment of the present invention. What is shown in FIG. 17 is a portion of a semiconductor chip 254 comprising a semiconductor material 256 which can be p-type conductivity or n-type conductivity. A doped region 260 and doped regions 262 are formed in portions of semiconductor material 256. Doped regions 258 are formed over and extend into doped regions 262 and are shallower than doped regions 262. Doped regions 258, 260, and 262 are further described with reference to FIG. 18. It should be noted that doped regions 258 and 262 are illustrated by a single rectangular structure because doped regions 258 overlie doped regions 262. Doped regions 258 and 262 serve as portions of a photodiode such as, for example, photodiode 12 shown in FIG. 16. Doped regions 258 are of opposite conductivity type to doped regions 260 and 262. By way of example, semiconductor material 256 may be an epitaxial layer of p-type conductivity formed over a semiconductor substrate of p-type conductivity (not shown), doped regions 260 and 262 may be regions doped with an impurity material of n-type conductivity, and doped regions 258 may be regions doped with an impurity material of p-type conductivity. In accordance with embodiments in which doped regions 258 and 262 form a photodiode where doped regions 258 are regions of p-type conductivity and doped regions 262 are regions of n-type conductivity that are buried by doped regions 258, the photodiode regions form a structure capable of being fully depleted of charge and exhibiting a low dark leakage current.

FIG. 17 further illustrates a gate structure 264 and a contact 266 formed on gate structure 264. In accordance with an embodiment, gate structure 264 serves as a gate structure for transfer transistor 14. As discussed above a gate structure is comprised of a gate electrode and a gate dielectric material. The gate electrode and gate dielectric materials are further illustrated in FIG. 18 and are collectively referred to as a gate structure. The gate structure is referred to as a gate in the figures containing circuit schematics. In addition, FIG. 17 illustrates a control structure 268 formed over a portion of doped region 262. By way of example, control structure 268 is a square-shaped annular structure formed over a portion of semiconductor material 256. Portions 258A and 262A of doped regions 258 and 262, respectively, are in a portion of semiconductor material 256 that is surrounded by annular shaped control structure 268 and portions 258B and 262B of doped regions 258 and 262, respectively, are external to annular shaped control structure 268. Control structure 268 may be referred to as a gate structure and is comprised of an electrode and a dielectric material. A contact 270 is formed on control structure 268. It should be noted that the type of annular shape for control structure 268 is not a limitation. For example, the annular shape may be an elliptical annular shape, a circular annular shape, a triangular annular shape, a pentagonal annular shape, other polygonal annular shapes, or the like.

Figure 18:
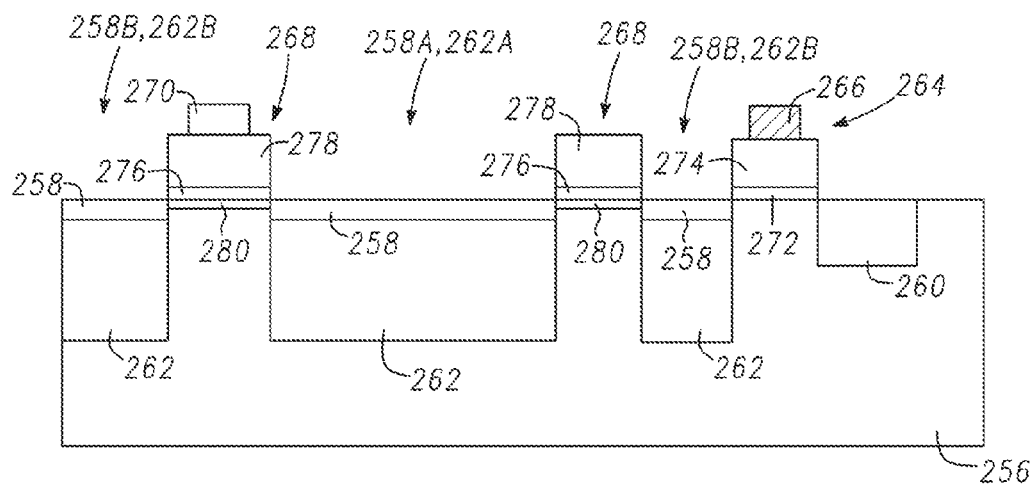
FIG. 18 is a cross-sectional view of the pixel of FIG. 17 taken along section line 18-18 of FIG. 17 in accordance with another embodiment of the present invention.

FIG. 18 is a cross-sectional view of pixel 250 taken along section line 18-18 of FIG. 17. What is shown in FIG. 18 are a portion of doped region 260, portions of doped region 262, and portions of doped region 258 formed within doped region 262. FIG. 18 further illustrates gate structure 264 of transfer transistor 14 which is comprised of a gate dielectric material 272 formed on or from a portion of semiconductor material 256 and a gate electrode 274 formed on gate dielectric material 272. Control electrode 268 overlies a portion of semiconductor material 256 that is between portions of doped region 258. Control electrode 268 is comprised of a dielectric material 276 that is formed on or from semiconductor material 256 and a control electrode 278. Electrical contact 270 is formed over control electrode 268. For the sake of completeness, inversion layers 280 are shown as being formed in the portions of semiconductor material 256 that are below control electrode 268 and laterally adjacent portions of doped region 258 in response to a control voltage $V_{GAT}$ being applied to the control electrode of gating device 252, e.g., control voltage $V_{GAT}$ applied to control electrode 268.

Figure 19:
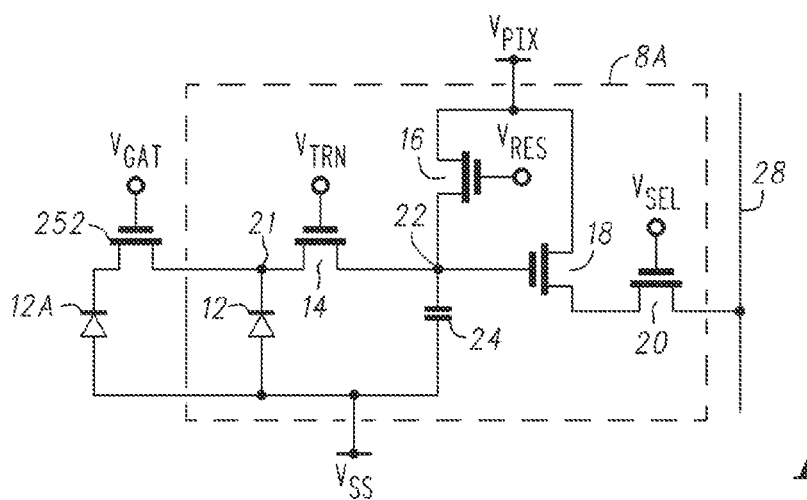
FIG. 19 is a circuit schematic of a pixel in accordance with another embodiment of the present invention.

FIG. 19 is a circuit schematic of a four transistor (4T) pixel 300 in accordance with another embodiment of the present invention. Pixel 300 is similar to pixel 10A illustrated in FIG. 2 except that gating device 26 has been replaced by gating device 252 and photodiode 12A has been coupled to gating device 252. Accordingly, gating device 252 has a terminal connected to node 21, a terminal connected to a terminal of photodiode 12A and a control terminal or electrode coupled for receiving control signal $V_{GAT}$. The other terminal of photodiode 12A is coupled for receiving source of operating potential $V_{SS}$. Photodiode 12, transistors 14, 16, 18, and 20, floating diffusion capacitance 24, and column line 28 have been described with reference to FIG. 2.

Figure 20:
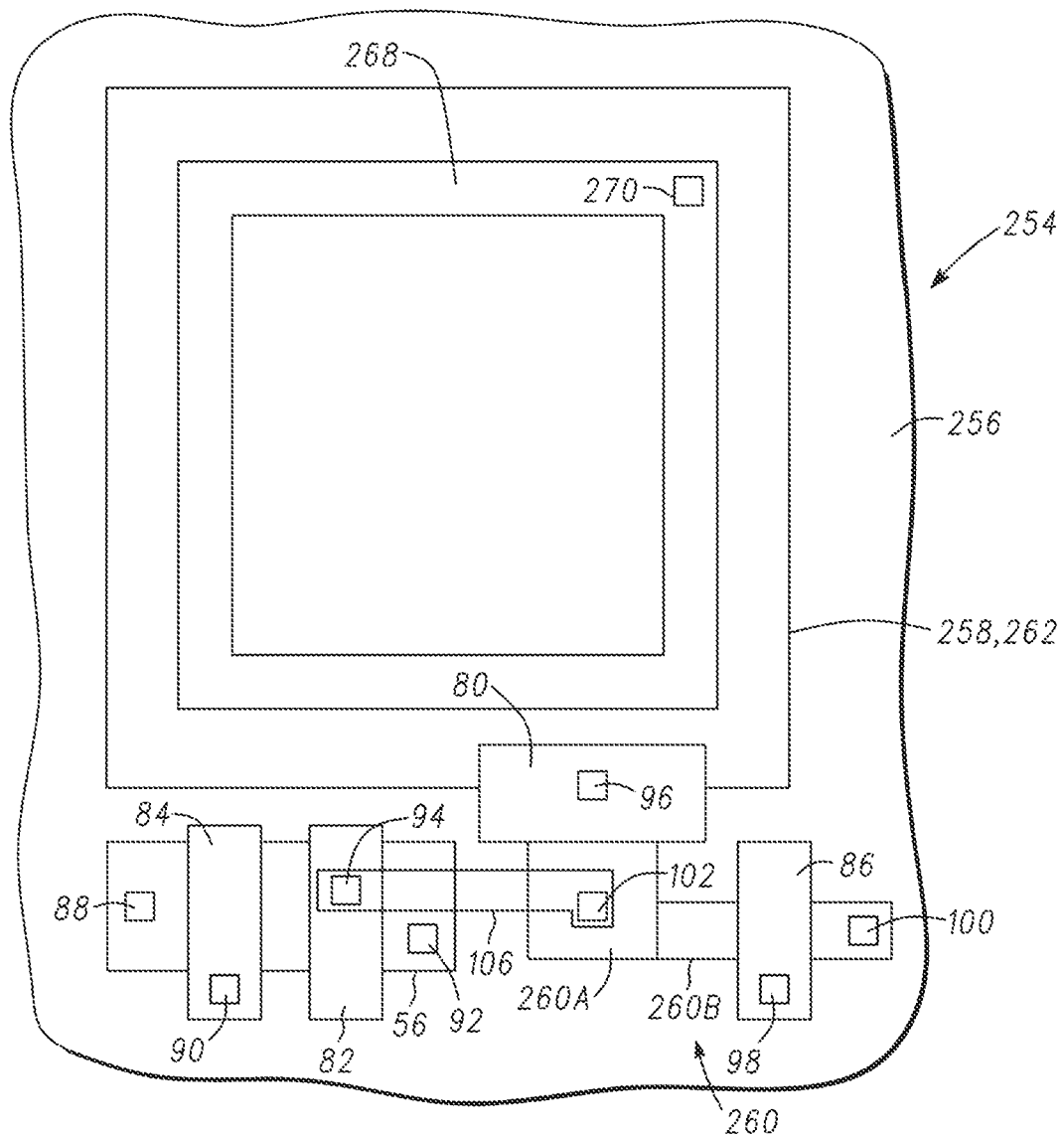
FIG. 20 is a top view of the pixel of FIG. 19 during manufacture in accordance with another embodiment of the present invention.

FIG. 20 is a top view of pixel 300 during manufacture in accordance with an embodiment of the present invention. What is shown in FIG. 20 is a portion of a semiconductor chip 254 comprising a semiconductor material 256 which can be of p-type conductivity or n-type conductivity. Doped regions 262, 56, and 260 are formed in portions of semiconductor material 256. Doped regions 258 are formed over and extend into doped regions 262 and are shallower than doped regions 262. It should be noted that doped regions 258 and 262 are illustrated by a single rectangular structure because doped regions 258 overlie doped regions 262. Doped regions 258 and 262 serve as portions of photodiodes such as, for example, photodiodes 12 and 12A shown in FIG. 19. Doped regions 258 are of opposite conductivity type to doped regions 56, 260, and 262. Doped region 260 may be comprised of portions 260A and 260B that form an L-shaped region and is spaced apart from doped region 56. By way of example, semiconductor material 256 may be an epitaxial layer of p-type conductivity formed over a semiconductor substrate of p-type conductivity (not shown), doped regions 56, 260, and 262 may be regions doped with an impurity material of n-type conductivity, and doped regions 258 may be regions doped with an impurity material of p-type conductivity. Doped region 260A serves as a floating diffusion region which may form a portion of floating diffusion capacitance 24. In accordance with embodiments in which doped regions 258 and 262 form photodiodes 12 and 12A, where doped regions 258 are regions of p-type conductivity and doped regions 262 are regions of n-type conductivity that are buried by doped regions 258, photodiodes 12 and 12A are structures capable of being fully depleted of charge and exhibiting low dark leakage currents.

FIG. 20 further illustrates gate structures 80, 82, 84, and 86, contacts 88, 90, 92, 94, 96, 98, 100, and 102, and an interconnect 106 which have been described with reference to FIG. 3. In addition, FIG. 20 illustrates a control structure or control electrode 268 formed laterally adjacent to doped regions 262 and a contact 270. Control structure 268 may be referred to as a gate structure and is comprised of an electrode and a dielectric material.

Figure 21:
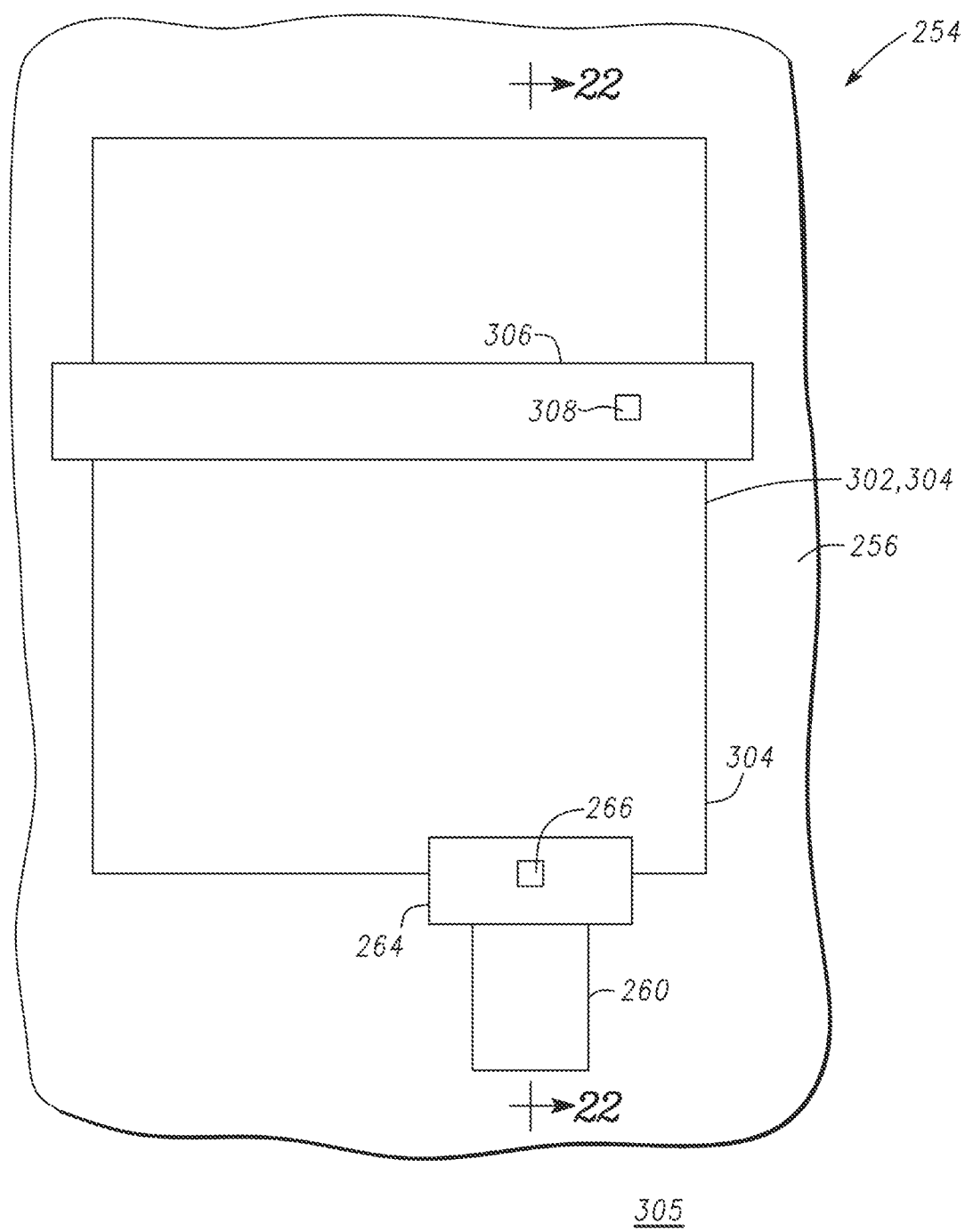
FIG. 21 is a top view of the pixel of FIG. 19 during manufacture in accordance with another embodiment of the present invention.

FIG. 21 is a top view of pixel 305 during manufacture in accordance with another embodiment of the present invention. What is shown in FIG. 21 is a portion of a semiconductor chip 254 comprising a semiconductor material 256 which can be p-type conductivity or n-type conductivity. A doped region 260 and doped regions 302 are formed in portions of semiconductor material 256. A doped region 304 is formed over and extends into doped region 302 and is shallower than doped region 302. It should be noted that doped regions 302 and 304 are illustrated by a single rectangular structure because doped regions 304 overlie doped regions 302. Doped regions 302 and 304 serve as portions of photodiodes such as, for example, photodiodes 12 and 12A shown in FIG. 16. Doped regions 304 are of opposite conductivity type to doped regions 260 and 302. By way of example, semiconductor material 256 may be an epitaxial layer of p-type conductivity formed over a semiconductor substrate of p-type conductivity (not shown), doped regions 260 and 302 may be regions doped with an impurity material of n-type conductivity, and doped regions 304 may be regions doped with an impurity material of p-type conductivity. In accordance with embodiments in which doped regions 302 and 304 form photodiodes where doped regions 304 are regions of p-type conductivity and doped regions 302 are regions of n-type conductivity that are buried by doped regions 304, the photodiodes 12 and 12A form structures capable of being fully depleted of charge and exhibiting a low dark leakage current.

FIG. 21 further illustrates a gate structure 264 and a contact 266 formed on gate structure 264. In accordance with an embodiment, gate structure 264 serves as a gate structure for transfer transistor 14. As discussed above a gate structure is comprised of a gate electrode and a gate dielectric material. The gate electrode and gate dielectric materials are further illustrated in FIG. 22 and are collectively referred to as a gate structure. The gate structure is referred to as a gate in the figures containing circuit schematics. In addition, FIG. 21 illustrates a control structure 306 formed over a portion of semiconductor material 256, wherein control structure 306 extends over doped region 304. By way of example, control structure 306 is a rectangular shaped structure formed over a portion of semiconductor material 256. Control structure 306 may be referred to as a gate structure and is comprised of an electrode and a dielectric material. A contact 308 is formed on control structure 306. It should be noted control structure 306 is not limited to being a rectangular shaped structure.

Figure 22:
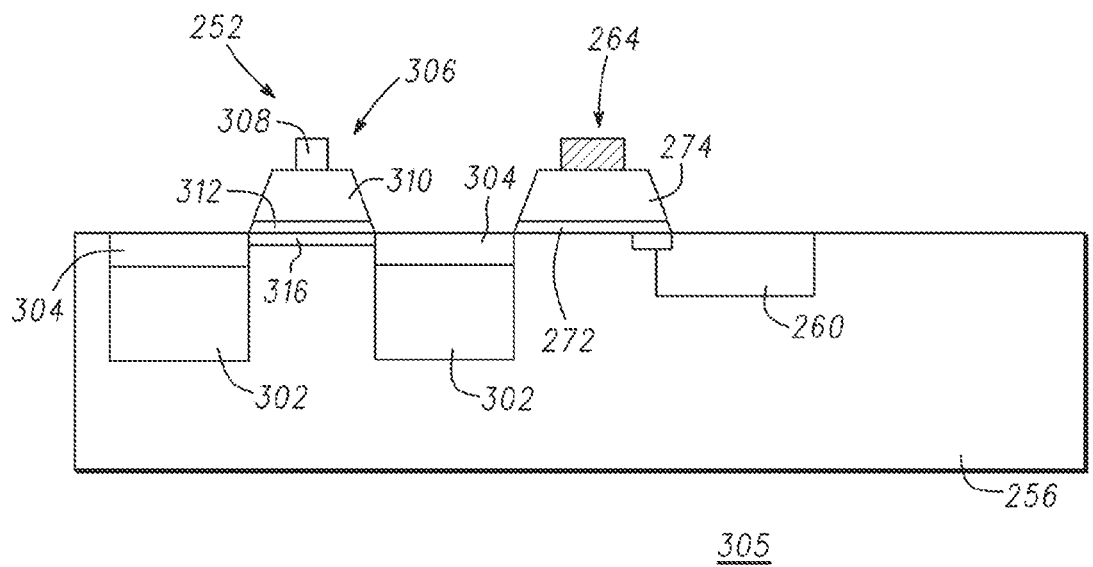
FIG. 22 is a cross-sectional view of the pixel of FIG. 19 taken along section line 22-22 of FIG. 21 in accordance with another embodiment of the present invention.

FIG. 22 is a cross-sectional view of pixel 305 taken along section line 22-22 of FIG. 21. What is shown in FIG. 22 are a portion of doped region 260, portions of doped regions 302, and portions of doped regions 304 formed within doped regions 302. FIG. 22 further illustrates gate structure 264 of transfer transistor 14 which is comprised of a gate dielectric material 272 formed on or from a portion of semiconductor material 256 and a gate electrode 274 formed on gate dielectric material 272. Control electrode 306 overlaps a portion of semiconductor material 256 that is between portions of doped regions 302 and 304. Control electrode 308 is comprised of a dielectric material 312 that is formed on or from semiconductor material 256 and a control electrode 314. Electrical contact 308 is formed over control electrode 310. For the sake of completeness, an inversion layer 316 is shown that may be formed in the portion of semiconductor material 256 that is below control electrode 306 and laterally adjacent portions of doped regions 304 in response to a control voltage $V_{GAT}$ applied to the control electrode of gating device 252, e.g., control voltage $V_{GAT}$ applied to control electrode 306.

By now it should be appreciated that a pixel and a method for storing charge in the pixel have been provided. In accordance with an embodiment, a pixel comprises an overflow gating device connected to a photodiode and a transistor. In accordance with other embodiments, a pixel comprises an overflow gating device connected to a pixel core, which may be comprised of, for example, a 4T pixel, a 5T pixel, a 6T pixel, etc. It should be understood that the type of pixel core is not a limitation of the present invention. The pixel core may be a 4T pixel, a 5T pixel, a 6T pixel, etc. The overflow gating device serves as a gate to allow the collection of charge from a photodiode of the pixel core and as a storage location for the collected charge. The overflow gating device may be configured to collect electrons or holes. In accordance with another embodiment, a method for storing charges in a pixel comprises providing a charge reception structure, coupling the charge reception structure to a photodetector, and storing charges in the charge reception structure, wherein the charges stored in the charge reception structure are received by the charge reception structure in response to light generated electrons.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A pixel, comprising:
a transfer transistor having a control electrode and first and second current carrying electrodes;
a photodiode having a first terminal coupled to the first current carrying electrode of the transfer transistor;
a second reset transistor having a control electrode and first and second current carrying electrodes, wherein the first current carrying electrode of the second reset transistor is coupled for receiving a first source of operating potential and the second current carrying electrode of the second reset transistor is coupled to the first terminal of the photodiode and to the first current carrying electrode of the transfer transistor;and
a gating device having a control electrode and first and second electrodes, the first and second electrodes of the gating device coupled together and to the first terminal of the photodiode.

2. The pixel of claim 1, further including a first reset transistor having a control electrode and first and second current carrying electrodes, wherein the second current carrying electrode of the first reset transistor is coupled to the second current carrying electrode of the transfer transistor.

3. The pixel of claim 2, further including an amplifier having an input and an output, the input coupled to the second current carrying electrode of the transfer transistor.

4. The pixel of claim 3, wherein the amplifier comprises a transistor configured as a source follower device, the source follower device having a control electrode and first and second current carrying electrodes, the control electrode serving as the input of the amplifier and the first current carrying electrode serving as the output of the amplifier.

5. The pixel of claim 4, further including a select transistor having a control electrode and first and second current carrying electrodes, the first current carrying electrode coupled to the second current carrying electrode of the source follower transistor.

6. The pixel of claim 1, wherein the photodiode is a pinned photodiode.

7. The pixel of claim 1, wherein transfer transistor and gating device are monolithically integrated in a semiconductor substrate.

8. A pixel, comprising:
a pixel core having first and second terminals; and
a gating device coupled to the first terminal of the pixel core, wherein the gating device has a control electrode and first and second electrodes, and wherein the pixel core includes a first photodetector and the pixel further includes a second photodetector, wherein the first electrode of the gating device is coupled to the first photodetector and the second electrode of the gating device is coupled to the second photodetector.

9. The pixel of claim 8, wherein the pixel core comprises one of a 4T pixel or a 5T pixel.

10. The pixel of claim 8, wherein the pixel comprises:
a first switch having a control terminal and first and second terminals;
the first photodetector a having a first terminal coupled to the first terminal of the first switch and to the first electrode of the gating device;
a second switch having a control terminal and first and second terminals, the first terminal of the second switch coupled to the second terminal of the first switch;
a memory element coupled to the first terminal of the second switch;
an amplifier having an input and an output, the input coupled to the memory element; and
a third switch having a control terminal and first and second terminals, the first terminal of the third switch coupled to the output of the amplifier.

11. The pixel of claim 10, wherein each of the first, second, and third switches are transistors and the amplifier comprises a transistor configured as a source follower.

12. The pixel of claim 8, wherein the first and second electrodes of the gating device are coupled together and to the pixel core.

13. The pixel of claim 8, wherein the first photodetector is a pinned photodiode.

14. The pixel of claim 13, wherein the second photodetector is a pinned photodiode.

15. The pixel of claim 8, wherein the pixel core and the gating device are monolithically integrated in semiconductor substrate.

16. The pixel of claim 8, wherein the pixel comprises:
a first switch having a control terminal and first and second terminals;
the first photodetector having a first terminal coupled to the first terminal of the first switch and to the first electrode of the gating device; and
means for storing charge coupled to the second terminal of the first switch.

17. The pixel of claim 16, further including:
a second switch having a control terminal and first and second terminals, the first terminal of the second switch coupled to the second terminal of the first switch;
an amplifier having an input and an output, the input coupled to the means for storing charge; and
a third switch having a control terminal and first and second terminals, the first terminal of the third switch coupled to the output of the amplifier.

18. The pixel of claim 16, further including:
a first switch having a control terminal and first and second terminals;
the first photodetector having a first terminal coupled to the first terminal of the first switch and to the first electrode of the gating device; and
a second switch having a control terminal and first and second terminals, the first terminal of the second switch coupled to the second terminal of the first switch;
a memory element coupled to the first terminal of the second switch; and
an amplifier means coupled to the memory element.

19. The pixel of claim 18, further including a third switch having a control terminal and first and second terminals, the first terminal of the third switch coupled to the amplifier means.

20. The pixel of claim 19, wherein the amplifier means comprises a transistor configured as a source follower.

* * * * *